US008279889B2

(12) United States Patent
Rajendran et al.

(10) Patent No.: US 8,279,889 B2
(45) Date of Patent: Oct. 2, 2012

(54) SYSTEMS AND METHODS FOR DIMMING A FIRST PACKET ASSOCIATED WITH A FIRST BIT RATE TO A SECOND PACKET ASSOCIATED WITH A SECOND BIT RATE

(75) Inventors: Vivek Rajendran, San Diego, CA (US); Ananthapadmanabhan A. Kandhadai, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 486 days.

(21) Appl. No.: 11/619,798

(22) Filed: Jan. 4, 2007

(65) Prior Publication Data

US 2008/0165799 A1 Jul. 10, 2008

(51) Int. Cl.
*H04J 3/16* (2006.01)

(52) U.S. Cl. .......... 370/465

(58) Field of Classification Search .......... 370/465, 370/232–236, 236.1, 252–253, 280, 294, 370/333, 358, 391, 395.21, 395.41, 395.61, 370/395.64, 395.65, 521, 532–534, 538, 370/540, 543–545; 704/201–229

See application file for complete search history.

(56) References Cited

U.S. PATENT DOCUMENTS

| | | | | |
|---|---|---|---|---|
| 4,720,861 | A * | 1/1988 | Bertrand | 704/222 |
| 5,301,190 | A * | 4/1994 | Tsukuda et al. | 370/362 |
| 5,414,796 | A * | 5/1995 | Jacobs et al. | 704/221 |
| 6,134,523 | A * | 10/2000 | Nakajima et al. | 704/229 |
| 6,260,009 | B1 * | 7/2001 | Dejaco | 704/221 |
| 6,330,532 | B1 * | 12/2001 | Manjunath et al. | 704/219 |
| 6,714,597 | B1 * | 3/2004 | Antonio et al. | 375/296 |
| 6,738,391 | B1 | 5/2004 | Kim et al. | |
| 7,184,953 | B2 * | 2/2007 | Jabri et al. | 704/221 |
| 7,363,231 | B2 * | 4/2008 | Kikuiri et al. | 704/501 |
| 7,463,600 | B2 * | 12/2008 | Tong et al. | 370/314 |
| 7,505,899 | B2 * | 3/2009 | Serizawa | 704/219 |
| 7,574,351 | B2 * | 8/2009 | Anandakumar et al. | 704/201 |
| 7,725,311 | B2 * | 5/2010 | Bourokba et al. | 704/219 |
| 2001/0020905 | A1 * | 9/2001 | Gatepin et al. | 341/50 |
| 2001/0029450 | A1 * | 10/2001 | Fushimi et al. | 704/229 |
| 2003/0014242 | A1 * | 1/2003 | Ananthpadmanabhan et al. | 704/201 |

(Continued)

FOREIGN PATENT DOCUMENTS

CN 1132011 A 9/1996

(Continued)

OTHER PUBLICATIONS

International Search Report—PCT/US2007/088926—International Search Authority, European Patent Office, May 23, 2008.

(Continued)

*Primary Examiner* — Kwang B Yao
*Assistant Examiner* — Jung-Jen Liu
(74) *Attorney, Agent, or Firm* — Heejong Yoo

(57) ABSTRACT

A method for dimming a first packet associated with a first bit rate to a second packet associated with a second bit rate is described. A first packet is received. The first packet is analyzed to determine a first bit rate associated with the first packet. Bits associated with at least one parameter are discarded from the first packet. Remaining bits associated with one or more parameters and a special identifier are packed into a second packet associated with a second bit rate. The second packet is transmitted.

23 Claims, 12 Drawing Sheets

U.S. PATENT DOCUMENTS

| | | | | |
|---|---|---|---|---|
| 2003/0200092 | A1 * | 10/2003 | Gao et al. | 704/258 |
| 2004/0102969 | A1 * | 5/2004 | Manjunath et al. | 704/229 |
| 2004/0260542 | A1 * | 12/2004 | Ananthapadmanabhan et al. | 704/219 |
| 2005/0049855 | A1 * | 3/2005 | Chong-White et al. | 704/219 |
| 2005/0177364 | A1 | 8/2005 | Jelinek | |
| 2006/0109915 | A1 * | 5/2006 | Unger | 375/240.27 |
| 2006/0206318 | A1 * | 9/2006 | Kapoor et al. | 704/221 |
| 2006/0206334 | A1 * | 9/2006 | Kapoor et al. | 704/267 |
| 2008/0101228 | A1 * | 5/2008 | Rodriguez et al. | 370/232 |
| 2009/0323679 | A1 * | 12/2009 | Anandakumar et al. | 370/352 |

FOREIGN PATENT DOCUMENTS

| | | | |
|---|---|---|---|
| EP | 1645090 | A1 | 4/2006 |
| JP | 08146997 | | 6/1996 |
| JP | 2003532149 | A | 10/2003 |
| JP | 2004501391 | A | 1/2004 |
| RU | 2145775 | | 2/2000 |
| RU | 2234192 | C2 | 8/2004 |
| RU | 2237977 | C2 | 10/2004 |
| WO | WO9507578 | | 3/1995 |
| WO | WO9531055 | | 11/1995 |
| WO | WO0038179 | | 6/2000 |
| WO | WO0201763 | A1 | 1/2002 |
| WO | WO0233911 | A1 | 4/2002 |
| WO | WO2005099243 | A1 | 10/2005 |
| WO | WO2008037081 | | 4/2008 |

OTHER PUBLICATIONS

Jelinek, M at al: "On the Architecture of the CDMA2000—Variable-rate Multimode Wideband (VMR-WS) Speech Coding Standard," Acoustics, Speech, and Signal Processing, 2004. Proceedings, (ICASSP '04). IEEE international Conference on Montreal, Quebec:, Canada May 17-21, 2004, Piscataway, NJ, USA, IEEE, vol. 1, May 17, 2004, pp. 281-284, P01071 7620. ISBN: 0/7803-8484-9.

Written Opinion—PCT/US2007/088926—International Search Authority, European Patent Office, May 23, 2008.

Taiwan Search Report—TW097100467—TIPO—Jun. 8, 2011.

* cited by examiner

900

| 902 | 904 | 906 | 908 | 910 | 912 | 914 | 916 | 918 | 920 |
|---|---|---|---|---|---|---|---|---|---|
| Mode bit | 1 | 0 | 1 | 1 | 1 | 1 | 0 | 1 | 0 |
| Special half-rate ID | 0 | 0 | 2 | 0 | 2 | 0 | 2 | 0 | 0 |
| LSP | 28 | 22 | 28 | 28 | 28 | 16 | 16 | 16 | 8 |
| Lag/Special packet ID | 7 | 7 | 7 | 7 | 7 | 4 | 7 | 0 | 0 |
| Additional Lag | 0 | 0 | 7 | 0 | 7 | 0 | 0 | 0 | 0 |
| ACB Gain | 9 | 9 | 9 | 0 | 0 | 0 | 0 | 0 | 0 |
| FCB Index | 105 | 30 | 0 | 0 | 0 | 0 | 0 | 0 | 0 |
| FCB Gain | 15 | 12 | 0 | 0 | 0 | 0 | 0 | 0 | 0 |
| Delta lag | 5 | 0 | 0 | 0 | 0 | 0 | 0 | 0 | 0 |
| Amplitude | 0 | 0 | 0 | 28 | 28 | 18 | 0 | 0 | 0 |
| Global alignment | 0 | 0 | 0 | 7 | 7 | 0 | 0 | 0 | 0 |
| Band alignments | 0 | 0 | 0 | 99 | 0 | 0 | 0 | 0 | 0 |
| Energy VQ | 0 | 0 | 0 | 0 | 0 | 0 | 17 | 17 | 6 |
| Filter shape | 0 | 0 | 0 | 0 | 0 | 0 | 2 | 2 | 0 |
| Reserved | 1 | 0 | 26 | 1 | 0 | 1 | 36 | 4 | 2 |
| Total | 171 | 80 | 80 | 171 | 80 | 40 | 80 | 40 | 16 |

Fig. 9

SYSTEMS AND METHODS FOR DIMMING A FIRST PACKET ASSOCIATED WITH A FIRST BIT RATE TO A SECOND PACKET ASSOCIATED WITH A SECOND BIT RATE

TECHNICAL FIELD

The present systems and methods relate generally to speech processing technology. More specifically, the present systems and methods relate to dimming a first packet associated with a first bit rate to a second packet associated with a second bit rate.

BACKGROUND

Transmission of voice by digital techniques has become widespread, particularly in long distance and digital radio telephone applications. This, in turn, has created interest in determining the least amount of information that can be sent over a channel while maintaining the perceived quality of the reconstructed speech. Devices for compressing speech find use in many fields of telecommunications. An example of telecommunications is wireless communications. The field of wireless communications has many applications including, e.g., cordless telephones, pagers, wireless local loops, wireless telephony such as cellular and portable communication system (PCS) telephone systems, mobile Internet Protocol (IP) telephony and satellite communication systems. A particularly important application is wireless telephony for mobile subscribers.

BRIEF DESCRIPTION OF THE DRAWINGS

FIG. 9 is a chart illustrating the number of bits allocated to various types of packets;

DETAILED DESCRIPTION

Figure 1:
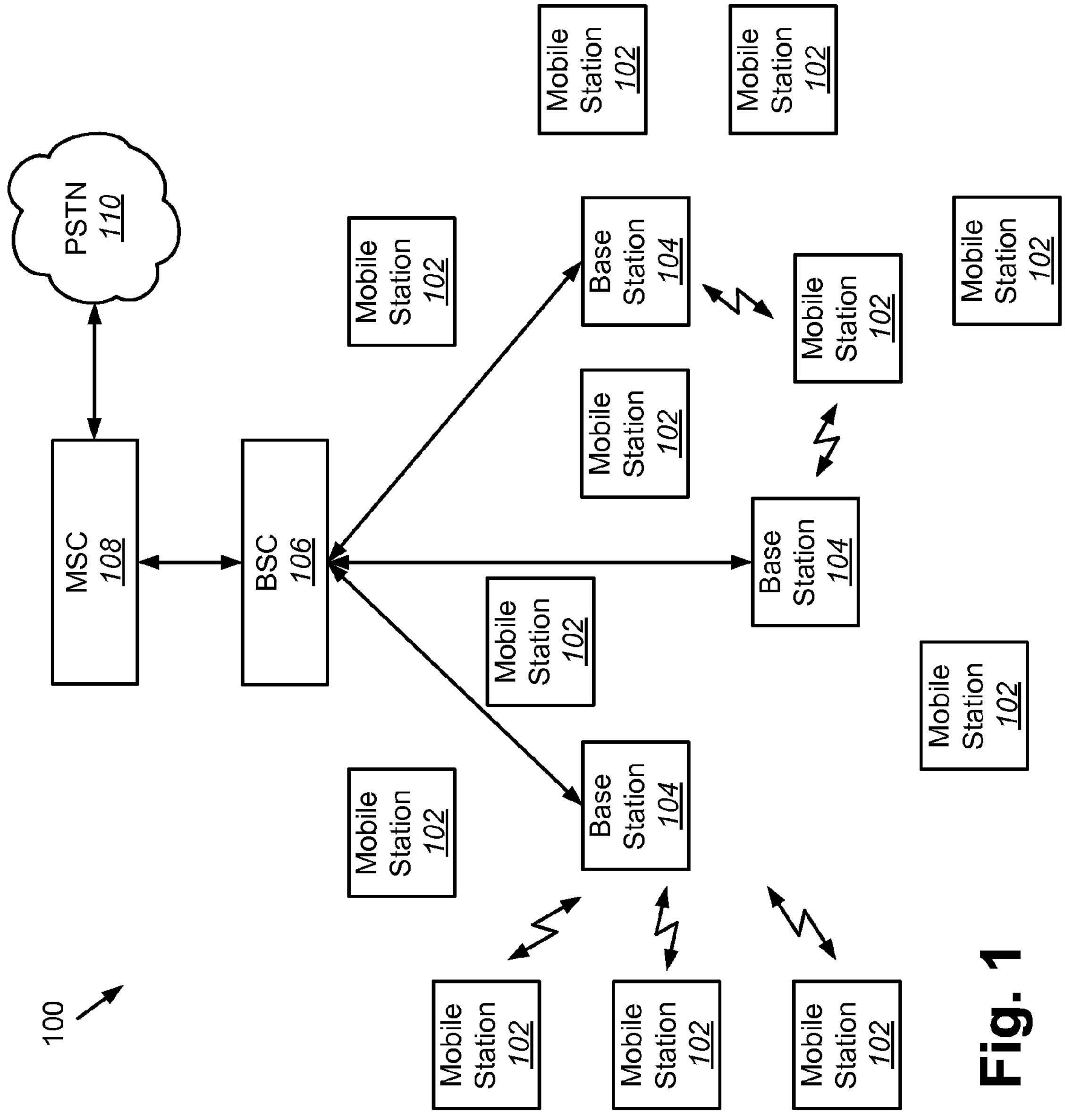
FIG. 1 illustrates one configuration of a wireless communication system.

A method for dimming a first packet associated with a first bit rate to a second packet associated with a second bit rate is described. A first packet is received. The first packet is analyzed to determine a first bit rate associated with the first packet. Bits associated with at least one parameter are discarded from the first packet. Remaining bits associated with one or more parameters and a special identifier are packed into a second packet associated with a second bit rate. The second packet is transmitted.

An apparatus for dimming a first packet associated with a first bit rate to a second packet associated with a second bit rate is also described. The apparatus includes a processor and memory in electronic communication with the processor. Instructions are stored in the memory. The instructions are executable to: receive a first packet; analyze the first packet to determine a first bit rate associated with the first packet; discard bits associated with at least one parameter from the first packet; pack remaining bits associated with one or more parameters and a special identifier into a second packet associated with a second bit rate; and transmit the second packet.

A system that is configured to dim a first packet associated with a first bit rate to a second packet associated with a second bit rate is also described. The system includes a means for processing and a means for receiving a first packet. A means for analyzing the first packet to determine a first bit rate associated with the first packet and a means for discarding bits associated with at least one parameter from the first packet are described. A means for packing remaining bits associated with one or more parameters and a special identifier into a second packet associated with a second bit rate and a means for transmitting the second packet are described.

A computer readable medium is also described. The medium is configured to store a set of instructions executable to: receive a first packet; analyze the first packet to determine a first bit rate associated with the first packet; discard bits associated with at least one parameter from the first packet; pack remaining bits associated with one or more parameters and a special identifier into a second packet associated with a second bit rate; and transmit the second packet.

A method for decoding a packet is also described. A packet is received. A special identifier included in the packet is read. A discovery is made that the packet was dimmed from a first packet associated with a first bit rate to a second packet associated with a second bit rate. A decoding mode is selected for the packet.

A method for dimming a packet from a full-rate to a half-rate is also described. A full-rate packet is received. The full-rate packet is dimmed to a half-rate packet by discarding bits associated with a parameter from the full-rate packet. The half-rate packet is packed with bits associated with signaling information. The half-rate packet is transmitted to a decoder.

Various configurations of the systems and methods are now described with reference to the Figures, where like reference numbers indicate identical or functionally similar elements. The features of the present systems and methods, as generally described and illustrated in the Figures herein, could be arranged and designed in a wide variety of different configurations. Thus, the detailed description below is not intended to limit the scope of the systems and methods, as claimed, but is merely representative of the configurations of the systems and methods.

Many features of the configurations disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present systems and methods.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms “a configuration,” “configuration,” “configurations,” “the configuration,” “the configurations,” “one or more configurations,” “some configurations,” “certain configurations,” “one configuration,” “another configuration” and the like mean “one or more (but not necessarily all) configurations of the disclosed systems and methods,” unless expressly specified otherwise.

The term “determining” (and grammatical variants thereof) is used in an extremely broad sense. The term “determining” encompasses a wide variety of actions and therefore “determining” can include calculating, computing, processing, deriving, investigating, looking up (e.g., looking up in a table, a database or another data structure), ascertaining and the like. Also, “determining” can include receiving (e.g., receiving information), accessing (e.g., accessing data in a memory) and the like. Also, “determining” can include resolving, selecting, choosing, establishing, and the like.

The phrase “based on” does not mean “based only on,” unless expressly specified otherwise. In other words, the phrase “based on” describes both “based only on” and “based at least on.”

A cellular network may include a radio network made up of a number of cells that are each served by a fixed transmitter. These multiple transmitters may be referred to as cell sites or base stations. A cell may communicate with other cells in the network by transmitting a speech signal to a base station over a communications channel. The cell may divide the speech signal into multiple frames (e.g. 20 milliseconds (ms) of the speech signal). Each frame may be encoded into a packet. The packet may include a certain quantity of bits which are then transmitted across the communications channel to a receiving base station or a receiving cell. The receiving base station or receiving cell may unpack the packet and decode the various frames to reconstruct the signal.

An inter-working function (IWF) at a base station may “dim” full-rate (171 bits) packets to half-rate (80 bits) packets before transmitting the packet across a communications channel. Dimming may be implemented for various types of packets, including full-rate prototype pitch period (PPP) packets and full-rate code excited linear prediction (CELP) packets.

After dimming a full-rate packet to a half-rate packet, signaling information may be added to the half-rate packet. Bits which may be unoccupied after dimming may be used to convey additional signaling information such as hand-offs, messages to increase transmitting power, etc. The resultant packet, which may include dimmed speech information and signaling information, may be sent to a decoder as a full-rate packet.

In addition, packets that are transmitted with a high quantity of bits may decrease the capacity of the cellular network. The quality of reconstructed speech signals may be improved by performing packet level dimming at the base station. Converting (or dimming) full-rate PPP and full-rate CELP packets to special half-rate PPP and special half-rate CELP packets and transmitting these special half-rate packets to a decoder may improve the quality of the reconstructed speech signals at the decoder as compared to erasing full-rate PPP or full-rate CELP packets. Dimming full-rate packets may also lower network traffic.

FIG. 1 illustrates a code-division multiple access (CDMA) wireless telephone system 100 that may include a plurality of mobile subscriber units 102 or mobile stations 102, a plurality of base stations 104, a base station controller (BSC) 106 and a mobile switching center (MSC) 108. The MSC 108 may be configured to interface with a conventional public switch telephone network (PSTN) 1110. The MSC 108 may also be configured to interface with the BSC 106. There may be more than one BSC 106 in the system 100. Each base station 104 may include at least one sector (not shown), where each sector may have an omnidirectional antenna or an antenna pointed in a particular direction radially away from the base stations 104. Alternatively, each sector may include two antennas for diversity reception. Each base station 104 may be designed to support a plurality of frequency assignments. The intersection of a sector and a frequency assignment may be referred to as a CDMA channel. The mobile subscriber units 102 may include cellular or portable communication system (PCS) telephones.

During operation of the cellular telephone system 100, the base stations 104 may receive sets of reverse link signals from sets of mobile stations 102. The mobile stations 102 may be conducting telephone calls or other communications. Each reverse link signal received by a given base station 104 may be processed within that base station 104. The resulting data may be forwarded to the BSC 106. The BSC 106 may provide call resource allocation and mobility management functionality including the orchestration of soft handoffs between base stations 104. The BSC 106 may also route the received data to the MSC 108, which provides additional routing services for interface with the PSTN 110. Similarly, the PSTN 18 may interface with the MSC 108, and the MSC 108 may interface with the BSC 106, which in turn may control the base stations 104 to transmit sets of forward link signals to sets of mobile stations 102.

Figure 2:
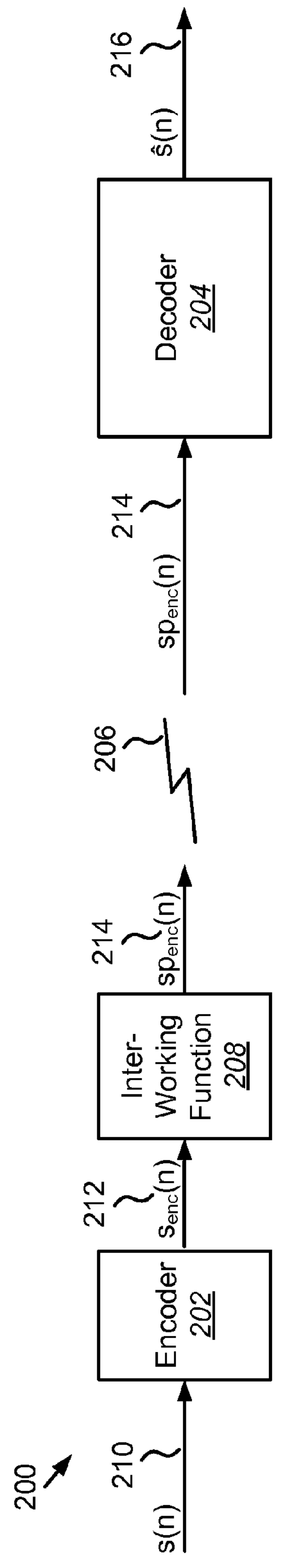
FIG. 2 is a block diagram illustrating one configuration of a signal transmission environment.

FIG. 2 depicts a signal transmission environment 200 including an encoder 202, a decoder 204, a transmission medium 206 and an inter-working function (IWF) 208. The encoder 202 may be implemented within a mobile station 102 or in a base station 104. The IWF 208 may be implemented within the base station 104. The decoder 204 may be implemented in the base station 104 or in the mobile station 102. The encoder 202 may encode a speech signal s(n) 210, forming an encoded speech signal $s_{enc}(n)$ 212. The encoded speech signal 212 may be converted to a special encoded packet $sp_{enc}(n)$ 214 for transmission across the transmission medium 206 to the decoder 204. The decoder 204 may unpack $sp_{enc}(n)$ 214 and decode $s_{enc}(n)$ 212, thereby generating a synthesized speech signal $\hat{s}(n)$ 216.

The term “coding” as used herein may refer generally to methods encompassing both encoding and decoding. Generally, coding systems, methods and apparatuses seek to minimize the number of bits transmitted via the transmission medium 206 (i.e., minimize the bandwidth of $sp_{enc}(n)$ 214) while maintaining acceptable speech reproduction (i.e., s(n) 210≈$\hat{s}(n)$ 216). The apparatus may be a mobile phone, a personal digital assistant (PDA), a lap top computer, a digital camera, a music player, a game device, a base station or any other device with a processor. The composition of the encoded speech signal 212 may vary according to the particular speech coding mode utilized by the encoder 202. Various coding modes are described below.

The components of the encoder 202, the decoder 204 and the IWF 208 described below may be implemented as electronic hardware, as computer software, or combinations of both. These components are described below in terms of their functionality. Whether the functionality is implemented as hardware or software may depend upon the particular application and design constraints imposed on the overall system. The transmission medium 206 may represent many different transmission media, including, but not limited to, a land-based communication line, a link between a base station and a satellite, wireless communication between a cellular telephone and a base station, or between a cellular telephone and a satellite.

Each party to a communication may transmit data as well as receive data. Each party may utilize an encoder 202 and a decoder 204. However, the signal transmission environment 200 will be described below as including the encoder 202 at one end of the transmission medium 206 and the decoder 204 at the other.

For purposes of this description, s(n) 210 may include a digital speech signal obtained during a typical conversation including different vocal sounds and periods of silence. The speech signal s(n) 210 may be partitioned into frames, and each frame may be further partitioned into subframes. These arbitrarily chosen frame/subframe boundaries may be used where some block processing is performed. Operations described as being performed on frames might also be performed on subframes, in this sense, frame and subframe are used interchangeably herein. However, s(n) 210 may not be partitioned into frames/subframes if continuous processing rather than block processing is implemented. As such, the block techniques described below may be extended to continuous processing.

The signal s(n) 210 may be digitally sampled at 8 kilo-hertz (kHz). Each frame may include 20 milliseconds (ms) of data, or 160 samples at the sampled 8 kHz rate. Each subframe may include 53 or 54 samples of data. While these parameters may be appropriate for speech coding, they are merely examples and other suitable alternative parameters could be used.

Figure 3:
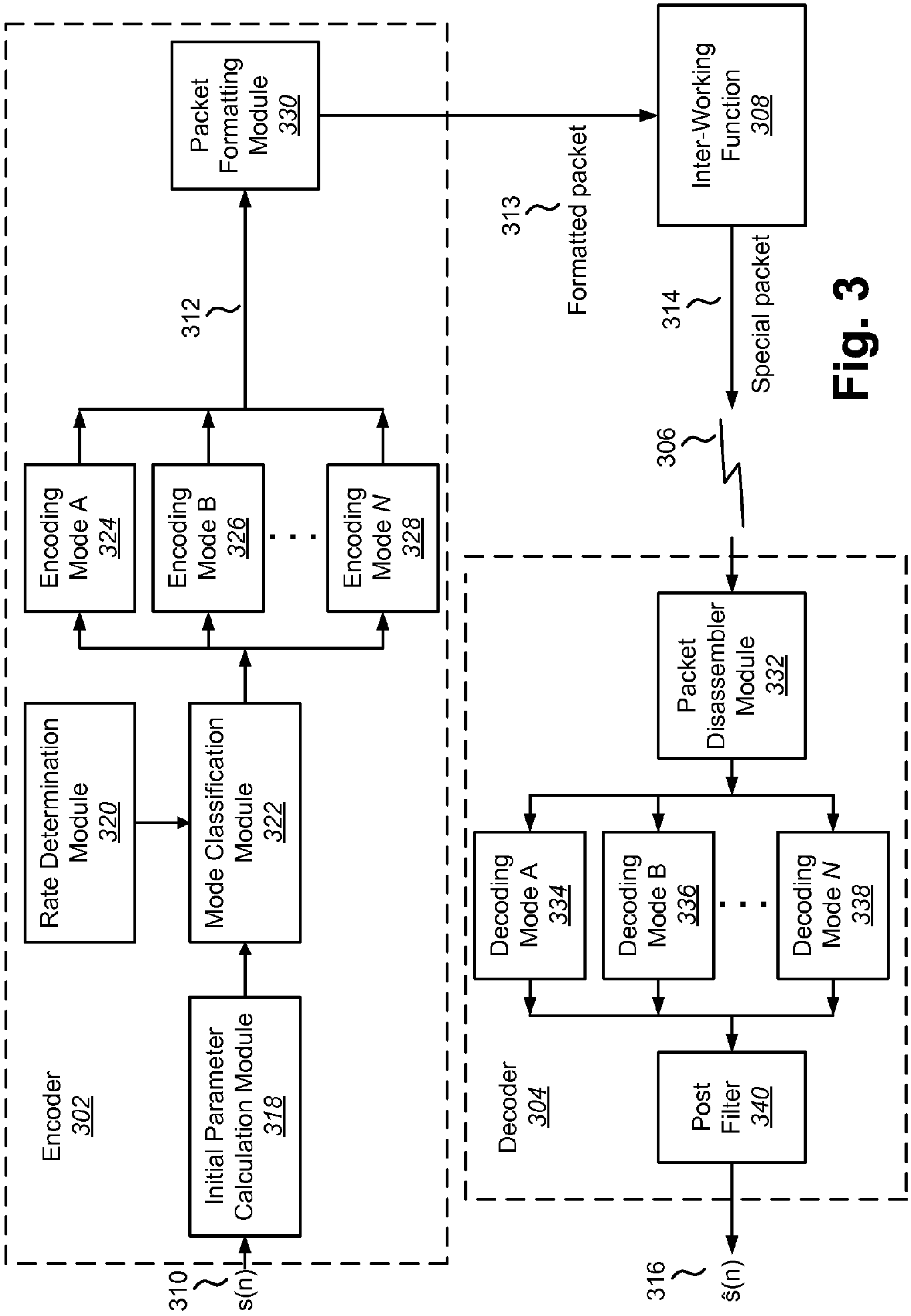
FIG. 3 is a block diagram illustrating one configuration of a multi-mode encoder communicating with a multi-mode decoder.

FIG. 3 is a block diagram illustrating one configuration of a multi-mode encoder 302 communicating with a multi-mode decoder 304 across a communications channel 306. The communication channel 306 may include a radio frequency (RF) interface. The encoder 302 may include an associated decoder (not shown). The encoder 302 and its associated decoder may form a first speech coder. The decoder 304 may include an associated encoder (not shown). The decoder 304 and its associated encoder may form a second speech coder.

The encoder 302 may include an initial parameter calculation module 318, a rate determination module 320, a mode classification module 322, a plurality of encoding modes 324, 326, 328 and a packet formatting module 330. The number of encoding modes 324, 326, 328 is shown as N, which may signify any number of encoding modes 324, 326, 328. For simplicity, three encoding modes 324, 326, 328 are shown, with a dotted line indicating the existence of other encoding modes.

The decoder 304 may include a packet disassembler module 332, a plurality of decoding modes 334, 336, 338 and a post filter 340. The number of decoding modes 334, 336, 338 is shown as N, which may signify any number of decoding modes 334, 336, 338. For simplicity, three decoding modes 334, 336, 338 are shown, with a dotted line indicating the existence of other decoding modes.

A speech signal, s(n) 310, may be provided to the initial parameter calculation module 318. The speech signal 310 may be divided into blocks of samples referred to as frames. The value n may designate the frame number or the value n may designate a sample number in a frame. In an alternate configuration, a linear prediction (LP) residual error signal may be used in place of the speech signal 310. The LP residual error signal may be used by speech coders such as a code excited linear prediction (CELP) coder.

The initial parameter calculation module 318 may derive various parameters based on the current frame. In one aspect, these parameters include at least one of the following: linear predictive coding (LPC) filter coefficients, line spectral pair (LSP) coefficients, normalized autocorrelation functions (NACFs), open-loop lag, zero crossing rates, band energies, and the formant residual signal.

The initial parameter calculation module 318 may be coupled to the mode classification module 322. The mode classification module 322 may dynamically switch between the encoding modes 324, 326, 328. The initial parameter calculation module 318 may provide parameters to the mode classification module 322. The mode classification module 322 may be coupled to the rate determination module 320. The rate determination module 320 may accept a rate command signal. The rate command signal may direct the encoder 302 to encode the speech signal 310 at a particular rate. In one aspect, the particular rate includes a full-rate which may indicate that the speech signal 310 is to be coded using one hundred and seventy-one bits. In another example, the particular rate includes a half-rate which may indicate that the speech signal 310 is to be coded using eighty bits. In a further example, the particular rate includes an eighth rate which may indicate that the speech signal 310 is to be coded using sixteen bits.

As previously stated, the mode classification module 322 may be coupled to dynamically switch between the encoding modes 324, 326, 328 on a frame-by-frame basis in order to select the most appropriate encoding mode 324, 326, 328 for the current frame. The mode classification module 322 may select a particular encoding mode 324, 326, 328 for the current frame by comparing the parameters with predefined threshold and/or ceiling values. In addition, the mode classification module 322 may select a particular encoding mode 324, 326, 328 based upon the rate command signal received from the rate determination module 320. For example, encoding mode A 324 may encode the speech signal 310 using one-hundred and seventy-one bits while encoding mode B 326 may encode the speech signal 310 using eighty bits.

Based upon the energy content of the frame, the mode classification module 322 may classify the frame as non-speech, or inactive speech (e.g., silence, background noise, or pauses between words), or speech. Based upon the periodicity of the frame, the mode classification module 322 may classify speech frames as a particular type of speech, e.g., voiced, unvoiced, or transient.

Figure 7A:
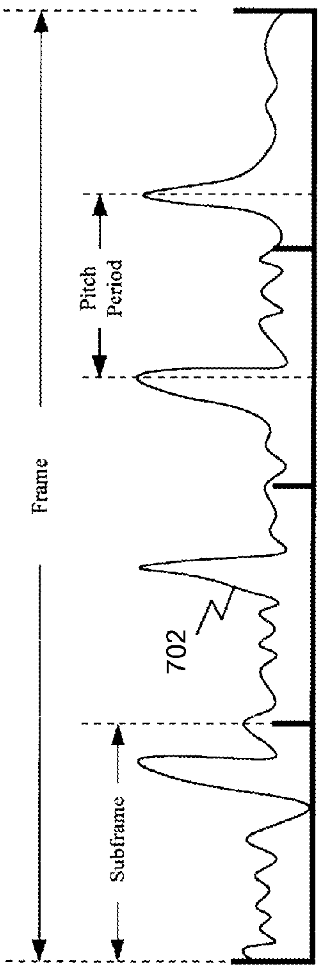
FIG. 7A is a diagram illustrating a frame of voiced speech split into subframes.
Figure 7B:
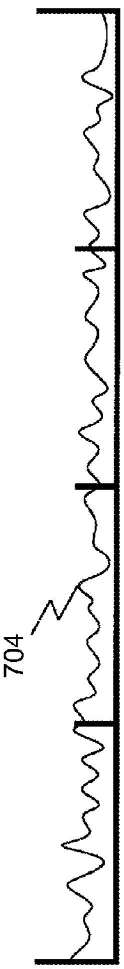
FIG. 7B is a diagram illustrating a frame of unvoiced speech split into subframes.
Figure 7C:
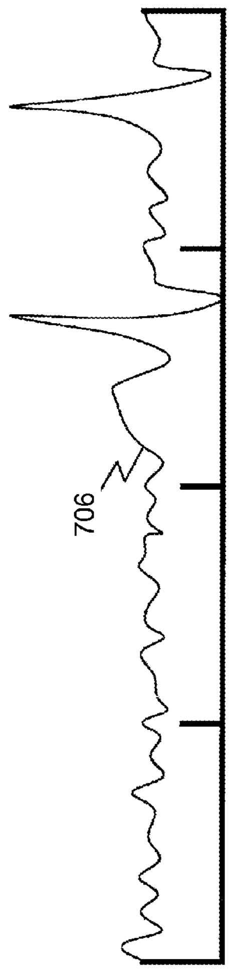
FIG. 7C is a diagram illustrating a frame of transient speech split into subframes.

Voiced speech may include speech that exhibits a relatively high degree of periodicity. A segment of voiced speech 702 is shown in the graph of FIG. 7A. As illustrated, a pitch period may be a component of a speech frame that may be used to analyze and reconstruct the contents of the frame. Unvoiced speech may include consonant sounds. A segment of unvoiced speech 704 is shown in the graph of FIG. 7B. Transient speech frames may include transitions between voiced and unvoiced speech. A segment of transient speech 706 is shown in the graph of FIG. 7C. Frames that are classified as neither voiced nor unvoiced speech may be classified as transient speech. The graphs illustrated in FIGS. 7A, 7B and 7C will be discussed in more detail below.

Classifying the speech frames may allow different encoding modes 324, 326, 328 to be used to encode different types of speech, resulting in more efficient use of bandwidth in a shared channel, such as the communication channel 306. For example, as voiced speech is periodic and thus highly predictive, a low-bit-rate, highly predictive encoding mode 324, 326, 328 may be employed to encode voiced speech.

The mode classification module 322 may select an encoding mode 324, 326, 328 for the current frame based upon the classification of the frame. The various encoding modes 324, 326, 328 may be coupled in parallel. One or more of the encoding modes 324, 326, 328 may be operational at any given time. In one configuration, one encoding mode 324, 326, 328 is selected according to the classification of the current frame.

The different encoding modes 324, 326, 328 may operate according to different coding bit rates, different coding schemes, or different combinations of coding bit rate and coding scheme. As previously stated, the various coding rates used may be full rate, half rate, quarter rate, and/or eighth rate. The various coding schemes used may be CELP coding, prototype pitch period (PPP) coding (or waveform interpolation (WI) coding), and/or noise excited linear prediction (NELP) coding. Thus, for example, a particular encoding mode 324, 326, 328 may be full rate CELP, another encoding mode 324, 326, 328 may be half rate CELP, another encoding mode 324, 326, 328 may be quarter rate PPP, and another encoding mode 324, 326, 328 may be NELP.

In accordance with a CELP encoding mode 324, 326, 328, a linear predictive vocal tract model may be excited with a quantized version of the LP residual signal. In CELP encoding mode, the entire current frame may be quantized. The CELP encoding mode 324, 326, 328 may provide for relatively accurate reproduction of speech but at the cost of a relatively high coding bit rate. The CELP encoding mode 324, 326, 328 may be used to encode frames classified as transient speech.

In accordance with a NELP encoding mode 324, 326, 328, a filtered, pseudo-random noise signal may be used to model the LP residual signal. The NELP encoding mode 324, 326, 328 may be a relatively simple technique that achieves a low bit rate. The NELP encoding mode 324, 326, 328 may be used to encode frames classified as unvoiced speech.

In accordance with a PPP encoding mode 324, 326, 328, a subset of the pitch periods within each frame may be encoded. The remaining periods of the speech signal may be reconstructed by interpolating between these prototype periods. In a time-domain implementation of PPP coding, a first set of parameters may be calculated that describes how to modify a previous prototype period to approximate the current prototype period. One or more codevectors may be selected which, when summed, approximate the difference between the current prototype period and the modified previous prototype period. A second set of parameters describes these selected codevectors. In a frequency-domain implementation of PPP coding, a set of parameters may be calculated to describe amplitude and phase spectra of the prototype. In accordance with the implementation of PPP coding, the decoder 304 may synthesize an output speech signal 316 by reconstructing a current prototype based upon the sets of parameters describing the amplitude and phase. The speech signal may be interpolated over the region between the current reconstructed prototype period and a previous reconstructed prototype period. The prototype may include a portion of the current frame that will be linearly interpolated with prototypes from previous frames that were similarly positioned within the frame in order to reconstruct the speech signal 310 or the LP residual signal at the decoder 304 (i.e., a past prototype period is used as a predictor of the current prototype period).

Coding the prototype period rather than the entire speech frame may reduce the coding bit rate. Frames classified as voiced speech may advantageously be coded with a PPP encoding mode 324, 326, 328. As illustrated in FIG. 7A, voiced speech may include slowly time-varying, periodic components that are exploited by the PPP encoding mode 324, 326, 328. By exploiting the periodicity of the voiced speech, the PPP encoding mode 324, 326, 328 may achieve a lower bit rate than the CELP encoding mode 324, 326, 328.

The selected encoding mode 324, 326, 328 may be coupled to the packet formatting module 330. The selected encoding mode 324, 326, 328 may encode, or quantize, the current frame and provide quantized frame parameters 312 to the packet formatting module 330. The packet formatting module 330 may assemble the quantized frame parameters 312 into a formatted packet 313. The packet formatting module 330 may be coupled to an IWF 308. The packet formatting module 330 may provide the formatted packet 313 to the IWF 308. The IWF 308 may convert the formatted packet 313 to a special packet 314. In one example, the formatted packet 313 includes a full-rate packet encoded by the CELP, PPP or NELP encoding modes 324, 326, 328. The IWF 308 may convert the full-rate formatted packet 313 to a special half-rate packet 314. In other words, the full-rate formatted packet (171 bits) 313 may be converted to a half-rate packet that includes 80 bits. The half-rate packet need not have exactly half the number of bits of a full-rate packet. The IWF 308 may provide the special half-rate packet 314 to a transmitter (not shown) and the special packet 314 may be converted to analog format, modulated, and transmitted over the communication channel 306 to a receiver (also not shown), which receives, demodulates, and digitizes the special packet 314, and provides the packet 314 to the decoder 304.

In the decoder 304, the packet disassembler module 332 receives the special packet 314 from the receiver. The packet disassembler module 332 may unpack the special packet 314 and discover that the special packet 314 has been converted from a full-rate to a half-rate packet. The module 332 may discover that the special packet has been converted by reading a special identifier included in the special packet. The packet disassembler module 332 may also be coupled to dynamically switch between the decoding modes 334, 336, 338 on a packet-by-packet basis. The number of decoding modes 334, 336, 338 may be the same as the number of encoding modes 324, 326, 328. Each numbered encoding mode 324, 326, 328 may be associated with a respective similarly numbered decoding mode 334, 336, 338 configured to employ the same coding bit rate and coding scheme.

If the packet disassembler module 332 detects the packet 314, the packet 314 is disassembled and provided to the pertinent decoding mode 334, 336, 338. If the packet disassembler module 332 does not detect a packet, a packet loss is declared and an erasure decoder (not shown) may perform frame erasure processing. The parallel array of decoding modes 334, 336, 338 may be coupled to the post filter 340. The pertinent decoding mode 334, 336, 338 may decode, or de-quantize, the packet 314 and provide the information to the post filter 340. The post filter 340 may reconstruct, or synthesize, the speech frame, outputting a synthesized speech frame, $\hat{s}(n)$ 316.

In one configuration, the quantized parameters themselves are not transmitted. Instead, codebook, indices specifying addresses in various lookup tables (LUTs) (not shown) in the decoder 304 are transmitted. The decoder 304 may receive the codebook indices and searches the various codebook LUTs for appropriate parameter values. Accordingly, codebook indices for parameters such as, e.g., pitch lag, adaptive codebook gain, and LSP may be transmitted, and three associated codebook LUTs may be searched by the decoder 304.

In accordance with the CELP encoding mode, pitch lag, amplitude, phase, and LSP parameters may be transmitted. The LSP codebook indices are transmitted because the LP residual signal may be synthesized at the decoder 304. Additionally, the difference between the pitch lag value for the current frame and the pitch lag value for the previous frame may be transmitted.

In accordance with a PPP encoding mode in which the speech signal 310 is to be synthesized at the decoder 304, the pitch lag, amplitude, and phase parameters are transmitted. The lower bit rate employed by PPP speech coding techniques may not permit transmission of both absolute pitch lag information and relative pitch lag difference values.

In accordance with one example, highly periodic frames such as voiced speech frames are transmitted with a low-bit-rate PPP encoding mode that quantizes the difference between the pitch lag value for the current frame and the pitch lag value for the previous frame for transmission, and does not quantize the pitch lag value for the current frame for transmission. Because voiced frames are highly periodic in nature, transmitting the difference value as opposed to the absolute pitch lag value may allow a lower coding bit rate to be achieved. In one aspect, this quantization is generalized such that a weighted sum of the parameter values for previous frames is computed, wherein the sum of the weights is one, and the weighted sum is subtracted from the parameter value for the current frame. The difference may then be quantized.

Figure 4:
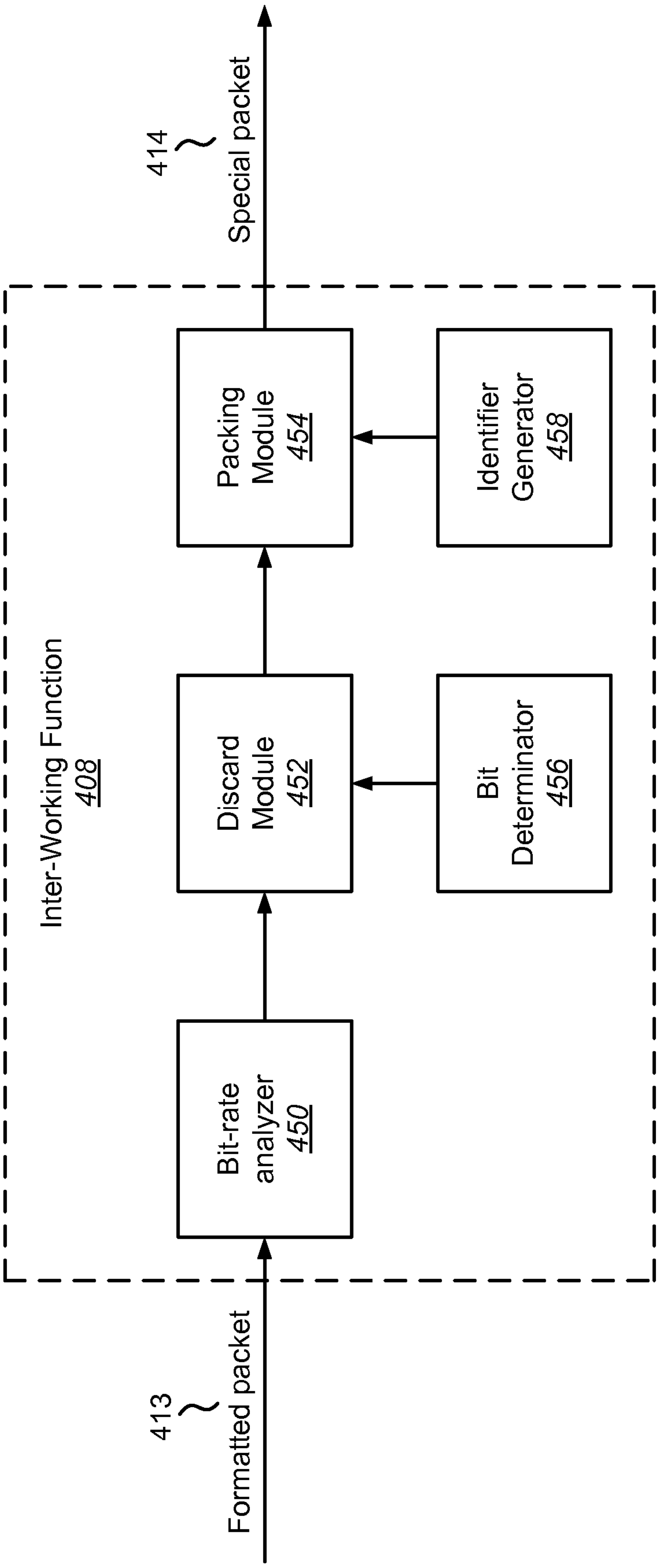
FIG. 4 is a block diagram illustrating one configuration of an inter-working function (IWF)

FIG. 4 is a block diagram illustrating one example of an IWF 408. The IWF 408 may convert a full-rate formatted packet 413 to a special half-rate packet 414. The IWF 408 may receive the formatted packet 413 and a bit-rate analyzer 450 may determine the number of bits included in the formatted packet 413. In one aspect, a full-rate formatted packet 413 includes one hundred and seventy-one bits. A discard module 452 may eliminate a certain quantity of bits associated with a quantized parameter included with the formatted packet 413. In one configuration, a bit determinator 456 determines which bits are discarded from the formatted packet 413. For example, the bit determinator 456 may determine that bits associated with a band alignment parameter are to be discarded. As such, the discard module 452 may eliminate the quantity of bits associated with this parameter.

The IWF 408 may also include a packing module 454. The packing module 454 may pack remaining bits that were not discarded by the discard module 452 into a special packet 414. In one aspect, the discard module 452 eliminates relatively half the bits included with the formatted packet 413. As such, the packing module 454 may pack the remaining bits into a special packet 414 that includes half the number of bits that were included with the formatted packet 413. An identifier generator 458 may provide a special identifier to the packing module 454. The packing module 454 may include the bits associated with the special identifier in the special packet 414. The special identifier may indicate to the decoder 304 that an incoming packet is a special half-rate packet 414. The special identifier may include a 7-bit value that ranges between the values of 101 and 127. The special identifier may be an illegal value in the sense that an encoder typically assigns a 7-bit value to packets that ranges from 0 to 100. A packet with a 7-bit value ranging between 101 and 127 may indicate to the decoder 304 that the packet has been converted from a full-rate to a special half-rate after the encoding process.

Figure 5:
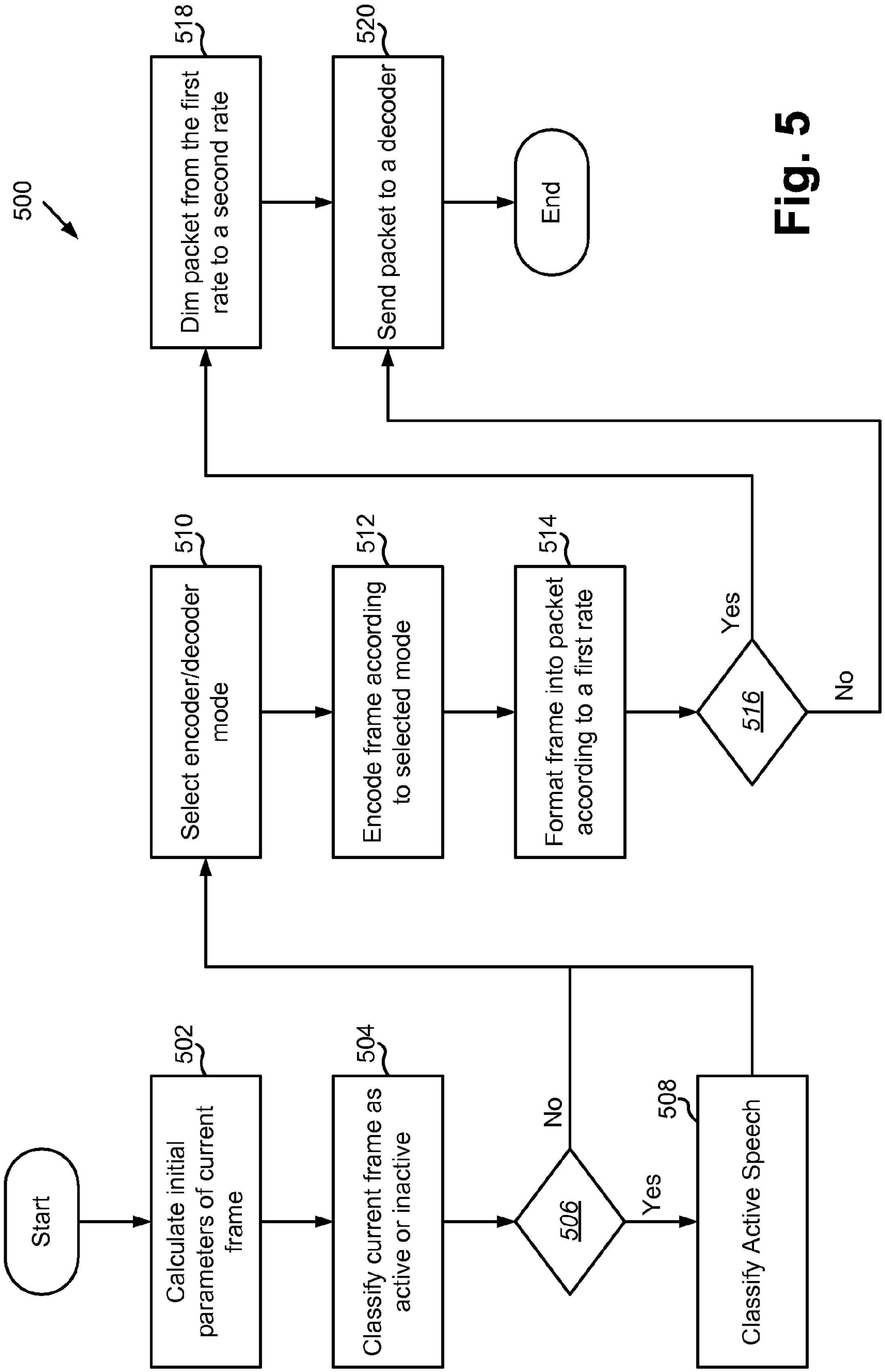
FIG. 5 is a flow diagram illustrating one configuration of a variable rate speech coding method.

FIG. 5 is a flow diagram illustrating one example of a variable rate speech coding method 500. In one aspect, the method 500 is implemented by a single mobile station 102 which may be enabled to receive a full-rate packet and convert that packet to a special half-rate packet. In other aspects, the method 500 may be implemented by more than one mobile station 102. In other words, one mobile station 102 may include an encoder to encode a full-rate packet while a separate mobile station 102, base station 104, etc. includes an IWF which may convert the full-rate packet to a special half-rate packet. Initial parameters of a current frame may be calculated 502. In one configuration, the initial parameter calculation module 318 calculates 502 the parameters. The parameters may include one or more of the following: linear predictive coding (LPC) filter coefficients, line spectral pairs (LSPs) coefficients, the normalized autocorrelation functions (NACFs), the open loop lag, band energies, the zero crossing rate, and the formant residual signal.

The current frame may be classified 504 as active or inactive. In one configuration, the classification module 322 classifies the current frame as including either "active" or "inactive" speech. As described above, s(n) 310 may include periods of speech and periods of silence. Active speech may include spoken words, whereas inactive speech may include everything else, e.g., background noise, silence, pauses.

A determination 506 is made whether the current frame was classified as active or inactive. If the current frame is classified as active, the active speech is further classified 508 as either voiced, unvoiced, or transient frames. Human speech may be classified in many different ways. Two classifications of speech may include voiced and unvoiced sounds. Speech that is not voiced or unvoiced may be classified as transient speech.

An encoder/decoder mode may be selected 510 based on the frame classification made in steps 506 and 508. The various encoder/decoder modes may be connected in parallel, as shown in FIG. 3. The different encoder/decoder modes operate according to different coding schemes. Certain modes may be more effective at coding portions of the speech signal s(n) 310 exhibiting certain properties.

As previously explained, the CELP mode may be chosen to code frames classified as transient speech. The PPP mode may be chosen to code frames classified as voiced speech. The NELP mode may be chosen to code frames classified as unvoiced speech. The same coding technique may frequently be operated at different bit rates, with varying levels of performance. The different encoder/decoder modes in FIG. 3 may represent different coding techniques, or the same coding technique operating at different bit rates, or combinations of the above.

The selected encoder mode may encode 512 the current frame and format 514 the encoded frame into a packet according to a first rate. A determination 516 is made if dim and burst signaling information is desired. In addition, a determination 516 is made if additional network capacity is desired. If no signaling or additional network capacity is desired, the packet may be sent 520 to a decoder. If signaling or additional network capacity is desired, the packet may be dimmed 518, in the base station, from the first rate to a second rate and then may be packed with signaling information before being sent 520 to the decoder. The first rate may include a greater quantity of bits than the second rate. In one aspect, dimming 518 the packet includes discarding a certain quantity of bits from the packet such that a lesser number of bits are transmitted to the decoder or in order to free up bits which may be used to send signaling information to the decoder.

Figure 6:
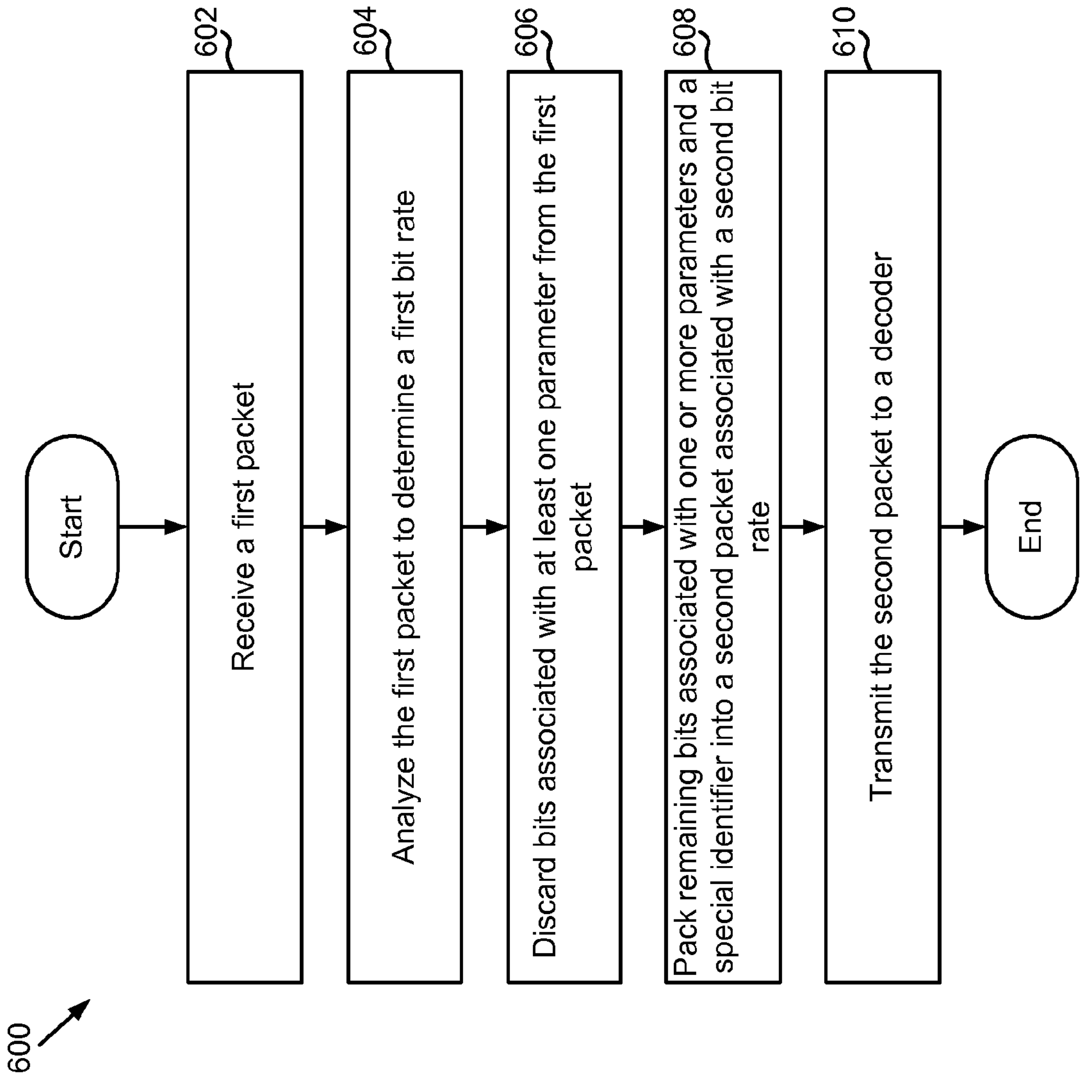
FIG. 6 is a flow diagram illustrating one configuration of a packet dimming method.

FIG. 6 is a flow diagram illustrating one example of a packet dimming method 600. The method 600 may be implemented by the IWF 208. A first packet may be received 602. The first packet may be the formatted packet 313 received from the encoder 302. The first packet may be analyzed 604 in order to determine a first bit rate associated wit the first packet. The first bit rate may indicate the number of bits included in the first packet. In one aspect, the bit-rate analyzer 450 analyzes the first packet in order to determine the bit rate. Bits associated with at least one parameter may be discarded 606 from the first packet. In one configuration, the discard module 452 discards the bits associated with a band alignment parameter. In the frequency domain implementation of PPP coding, a multi-band approach may be adopted to code the phase spectrum, where phase quantization is transformed into quantization of a series of linear phase shifts. A Discrete Fourier Series (DFS) transform may be used to transform the prototype pitch period (PPP) to frequency domain. A global alignment shift may be computed between an amplitude quantized, phase unquantized DFS and an amplitude quantized, phase zero DFS. The amplitude quantized, phase zero DFS may be shifted by the negative of this global alignment which may correspond to applying an expected linear phase shift to the PPP represented by the amplitude quantized, phase zero DFS to maximally align with the target PPP, which may correspond to the amplitude quantized, true phase DFS. In one aspect, the linear phase shift may be insufficient to capture the true phase of all harmonics, band focused alignment in addition to the global alignment are computed in multiple bands. This may correspond to the band alignment parameters which may be discarded.

The remaining bits in the first packet associated with one or more parameters may be packed 608 with a special identifier into a second packet. In one aspect, the second packet is associated with a second bit rate. The second bit rate may include fewer bits than the first bit rate. The special identifier may identify the second packet as including the second bit rate. The second packet may be transmitted 610 to a decoder. In one example, the second packet may be transmitted 610 from a first base station to a second base station. In another example, the second packet may be transmitted 610 from the first base station to another mobile station 102.

Figure 6A:
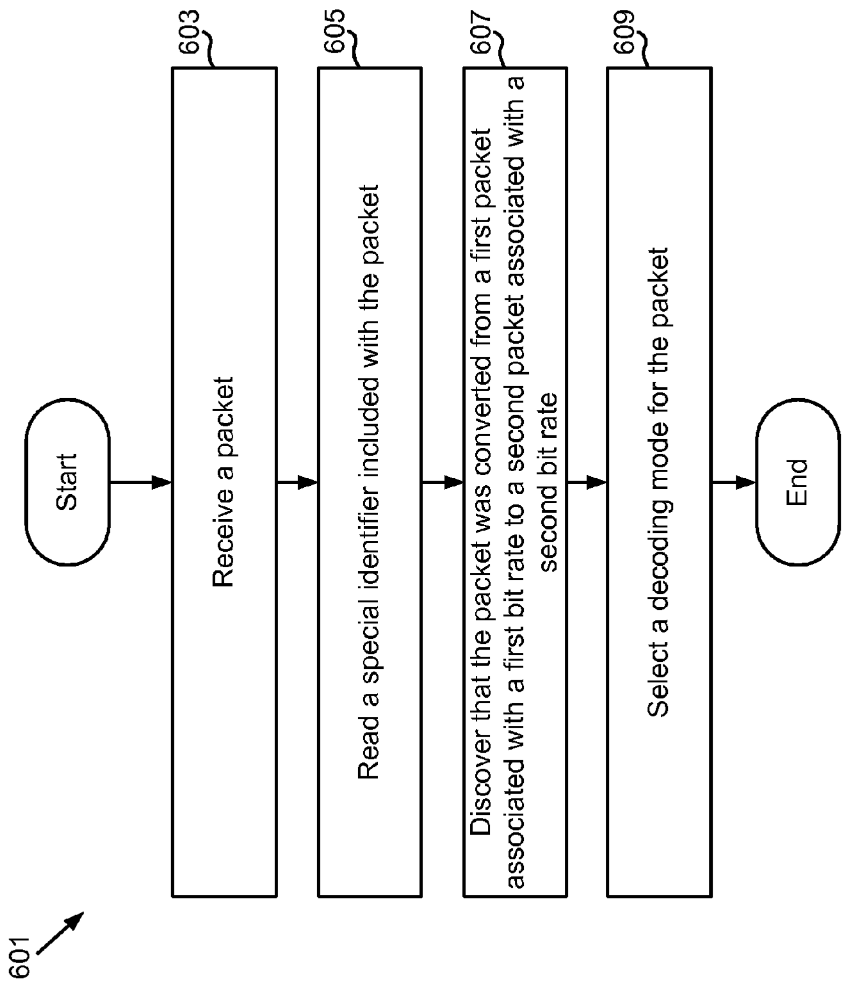
FIG. 6A is a flow diagram illustrating one configuration of decoding a packet.

FIG. 6A is a flow diagram illustrating one configuration of a method 601 to decode a packet. A packet may be received 603 and a special identifier included with the packet may be read 605. In one aspect, the special identifier is an illegal lag identifier. A discovery 607 may be made that the packet was converted from a first packet associated with a first bit rate to a second packet associated with a second bit rate. A decoding mode may be selected 609 for the packet and the packet may be decoded.

FIG. 7A depicts an example portion of the signal s(n) 310 including voiced speech 702. Voiced sounds may be produced by forcing air through the glottis with the tension of the vocal cords adjusted so that they vibrate in a relaxed oscillation, thereby producing quasi-periodic pulses of air which excite the vocal tract. One property measured in voiced speech is the pitch period, as shown in FIG. 7A.

FIG. 7B depicts an example portion of the signal s(n) 310 including unvoiced speech 704. Unvoiced sounds may be generated by forming a constriction at some point in the vocal tract (usually toward the mouth end), and forcing air through the constriction at a high enough velocity to produce turbulence. The resulting unvoiced speech signal resembles colored noise.

FIG. 7C depicts an example portion of the signal s(n) 310 including transient speech 706 (i.e., speech which is neither voiced nor unvoiced). The example transient speech 706 shown in FIG. 7C may represent s(n) 310 transitioning between unvoiced speech and voiced speech. Many different classifications of speech may be employed according to the techniques described herein to achieve comparable results.

Figure 8:
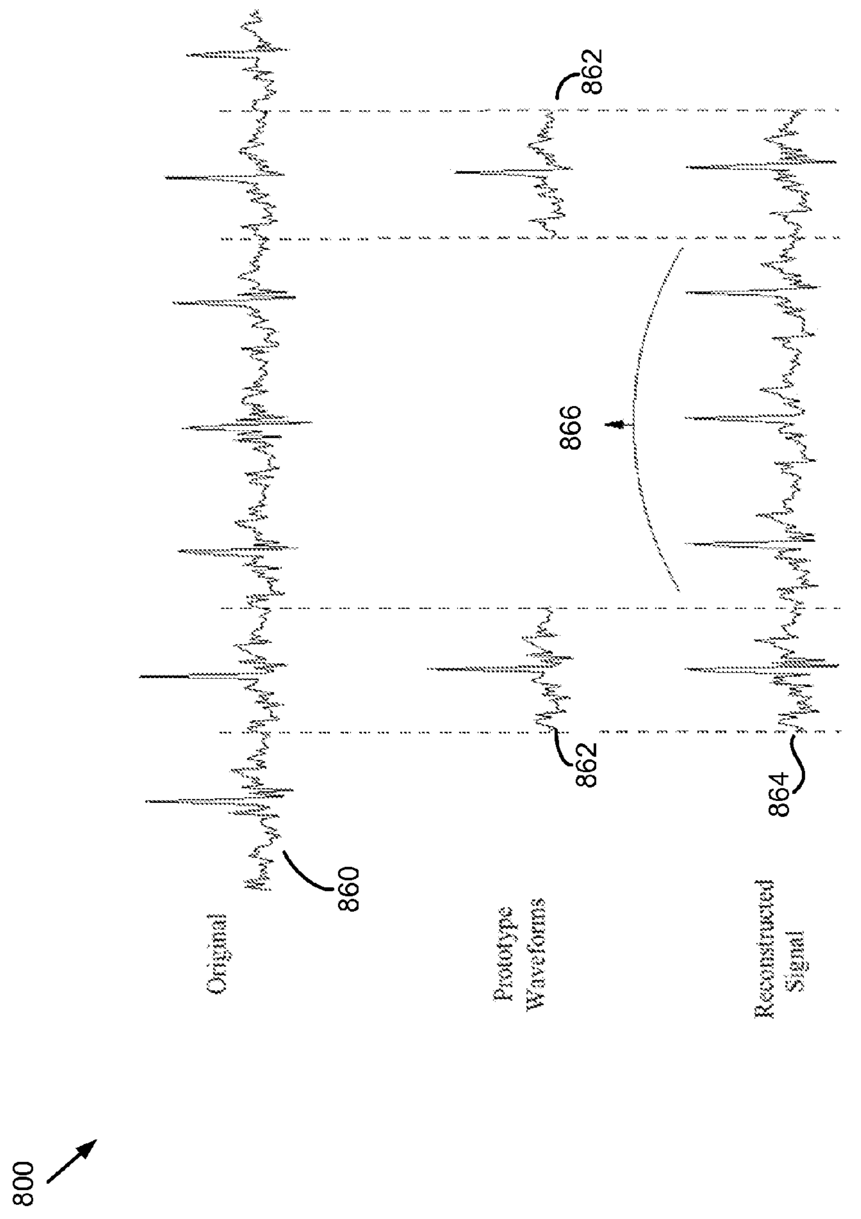
FIG. 8 is a graph illustrating principles of prototype pitch period (PPP) coding techniques.

The graph of FIG. 8 illustrates principles of the PPP coding technique. A single frame 800 may include an original signal s(n) 860. Pitch periods 862 (or prototype waveforms) may be extracted from the original signal 860 and encoded. The encoded pitch periods 862 may be used to generate a reconstructed signal 864. The reconstructed signal 864 may be a reconstruction of the original signal 860. Portions 866 of the original signal 860 that were not encoded may be reconstructed by interpolating between the pitch periods 862.

FIG. 9 is a chart 900 illustrating the number of bits allocated to various types of packets. The chart 900 includes a plurality of parameters 902. Each parameter within the plurality of parameters 902 may utilize a certain number of bits. The various packet types illustrated in the chart 900 may have been encoded utilizing one of the various encoding modes previously discussed. The packet types may include a full-rate CELP (FCELP) 904, a half-rate CELP (HCELP) 906, a special half-rate CELP (SPLHCELP) 908, a full-rate PPP (FPPP) 910, a special half-rate PPP (SPLHPPP) 912, a quarter-rate PPP (QPPP) 914, a special half-rate NELP (SPLH-NELP) 916, a quarter-rate NELP (QNELP) 918 and a silence encoder 920.

The FCELP 904 and the FPPP 910 may be packets with a total of 171 bits. The FCELP 904 packet may be converted to a SPLHCELP 908 packet. In one aspect, the FCELP 904 packet allocates bits for parameters such as a fixed codebook index (FCB Index) and a fixed codebook gain (FCB Gain). As shown, when the FCELP 904 packet is converted to a SPL-HCELP 908 packet, zero bits are allocated for parameters such as the FCB Index, the FCB Gain and a delta lag. In other words, the SPLHCELP 908 packet is transmitted to a decoder without these bits. The SPLHCELP 908 packet includes bits that are allocated for parameters such as a line spectral pair (LSP), an adaptive codebook (ACB) gain, a special identification (ID), special packet ID, pitch lag and mode-bit information. The total number of bits transmitted to a decoder may be reduced from 171 to 80.

Similarly, the FPPP 910 packet may be converted to a SPLHPPP 912 packet. As shown, the FPPP 910 packet allocates bits to band alignments parameters. When the FPPP 910 packet is converted to a SPLHPPP 912 packet, the bits allocated to the band alignments may be discarded. In other words, the SPLHPPP 912 packet is transmitted to a decoder without these bits. The total number of bits transmitted to a decoder may be reduced from 171 to 80. In one configuration, bits allocated to amplitude and global alignment parameters are included in the SPLHPPP 912 packet. The amplitude parameter may indicate the amplitude of the spectrum of the signal s(n) 310 and the global alignment parameter as previously mentioned may represent the linear phase shift which may ensure maximal alignment. In one aspect, the entire signal s(n) 310 ranges in a frequency of 50 Hz to 4 kHz.

In addition, the SPLHCELP 908, the SPLHPPP 912 and the SPLHNELP 916 packets may include bits allocated to an illegal lag parameter. The illegal lag parameter may represent a special identifier that allows a decoder to recognize the SPLHCELP 908 and the SPLHPPP 912 packets as packets that were converted from a full-rate to a half-rate after encoding or a half-rate frame including a NELP frame.

Various configurations herein are illustrated with different numbers of bits for different parameters and packets. The particular number of bits associated with each parameter herein is by way of example, and is not meant to be limiting. Parameters may include more or less bits than the examples used herein.

Figure 10:
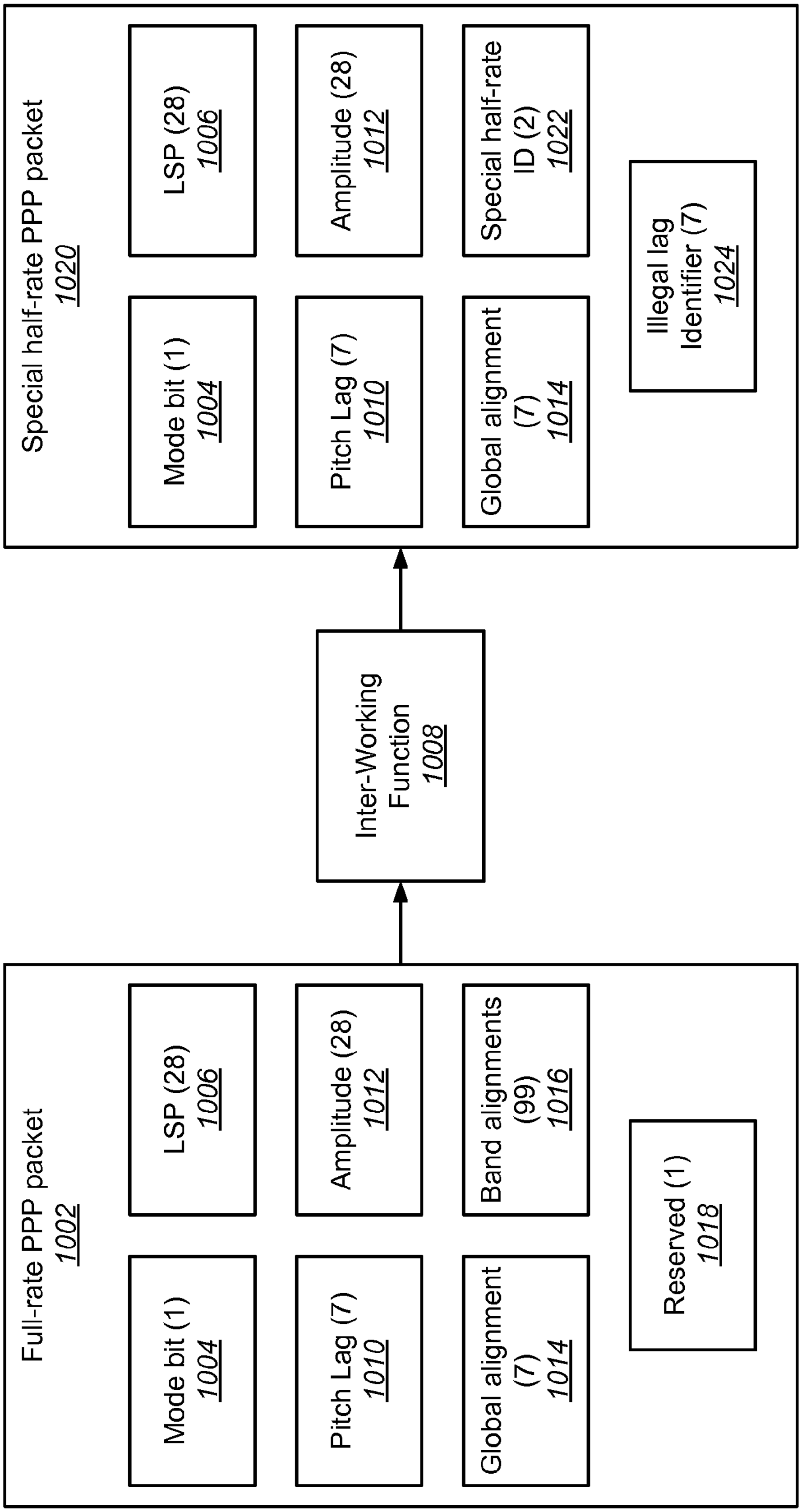
FIG. 10 is a block diagram illustrating one configuration of the conversion of a full-rate PPP packet to a special half-rate PPP packet.

FIG. 10 is a block diagram illustrating the conversion of a full-rate prototype pitch period (PPP) packet 1002 to a special half-rate PPP (SPLHPPP) packet 1020. The conversion may be implemented by an IWF 1008. The FPPP packet 1002 may include several parameters that are associated with a certain number of bits. Parameters included in the FPPP packet 1002 may include a mode bit 1004, which may be allocated a single bit, a line spectral pair (LSP) 1006, which may be allocated 28 bits, a pitch lag 1010, which may be allocated 7 bits, an amplitude 1012, which may be allocated 28 bits, a global alignment 1014, which may be allocated 7 bits, band alignments 1016, which may be allocated 99 bits and a reserved parameter 1018, which may be allocated 1 bit. In one aspect, the FPPP packet 1002 includes a total of 171 bits.

The IWF 1008 may convert the FPPP packet 1002 to a SPLHPPP packet 1020 as previously discussed. Once converted, the SPLHPPP packet 1020 may include a total of 80 bits. The IWF 1008 may discard the bits allocated to the band alignments 1016. In addition, the IWF 1008 may include a special half-rate ID 1022 in the SPLHPPP packet 1020, which may be allocated 2 bits. Further, the IWF 1008 may include an illegal lag identifier 1024 with the SPLHPPP packet 1020 which may serve as a special packet identifier. The illegal lag identifier 1024 may be allocated 7 bits and may allow a decoder to recognize the packet as a packet that was converted from a FPPP 1002 to a SPLHPPP 1020. In a further configuration, the 7 bits allocated to the illegal lag identifier 1024 may represent a value in the range of 101 to 127. Further, the IWF 1008 may include an additional lag which may be allocated 7 bits. This may be the pitch lag coming from the FPPP packet.

While the example illustrated in FIG. 10 includes the conversion of the FPPP packet 1002 to the SPLHPPP packet 1020, it is to be understood that a full-rate code excited linear prediction (FCELP) packet could also be converted to a special half-rate CELP (SPLHCELP) packet. The conversion from a FCELP packet to a SPLHCELP packet may be done in a similar manner as described with reference to the conversion of a FPPP packet to a SPLHPPP packet. The FCELP packet may include 171 bits and the SPLHCELP packet may include 80 bits.

Figure 11:
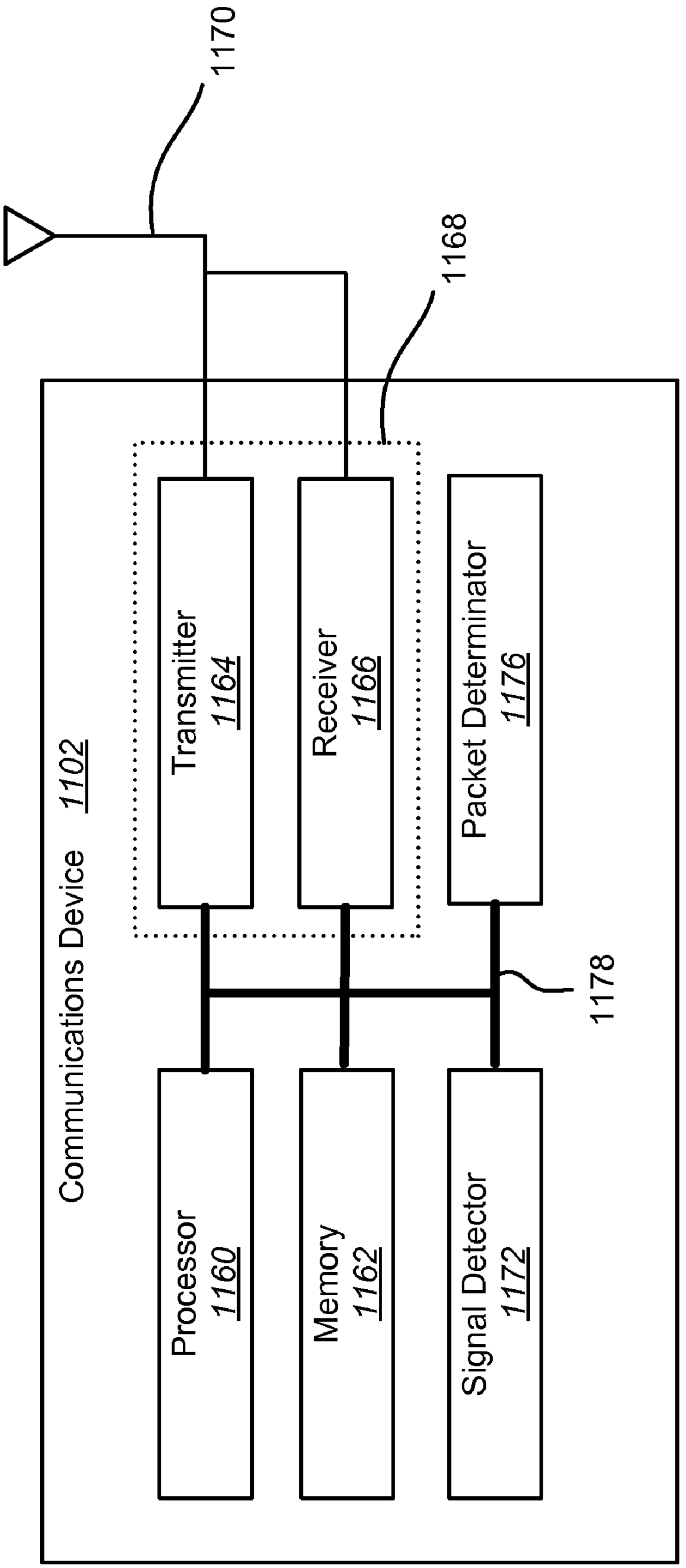
FIG. 11 is a block diagram of certain components in one configuration of a communications device.

FIG. 11 is a block diagram of certain components in an example of a communications device 1102. In the example shown in FIG. 11, the communications device 1102 may be a base station and/or a mobile station. The present systems and methods may be implemented in a communications device.

As shown, the device 1102 may include a processor 1160 which controls operation of the device 1102. A memory 1162, which may include both read-only memory (ROM) and random access memory (RAM), may provide instructions and data to the processor 1160. A portion of the memory 1162 may also include non-volatile random access memory (NVRAM).

The device 1102 may also include a transmitter 1164 and a receiver 1166 to allow transmission and reception of data 220 between the device 1102 and a remote location, such as a cell site controller or a mobile station 102. The transmitter 1164 and receiver 1166 may be combined into a transceiver 1168. An antenna 1170 is electrically coupled to the transceiver 1168.

The device 1102 may also include a signal detector 1172 used to detect and quantify the level of signals received by the transceiver 1168. The signal detector 1172 detects such signals as total energy, pilot energy per pseudonoise (PN) chips, power spectral density, and other signals. The device 1102 may also include a packet determinator 1176 used to determine which packets should be converted from a full-rate packet to a special half-rate packet.

The various components of the device 1102 are coupled together by a bus system 1178 which may include a power bus, a control signal bus, and a status signal bus in addition to a data bus. However, for the sake of clarity, the various busses are illustrated in FIG. 11 as the bus system 1178.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the configurations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present systems and methods.

The various illustrative logical blocks, modules, and circuits described in connection with the configurations disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the configurations disclosed herein may be embodied directly in hardware, in a software module executed by a processor, or in a combination of the two. A software module may reside in RAM memory, flash memory, ROM memory, erasable programmable read-only memory (EPROM), electrically erasable programmable read-only memory (EEPROM), registers, hard disk, a removable disk, a compact disc read-only memory (CD-ROM), or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present systems and methods. In other words, unless a specific order of steps or actions is specified for proper operation of the configuration, the order and/or use of specific steps and/or actions may be modified without departing from the scope of the present systems and methods. The methods disclosed herein may be implemented in hardware, software or both. Examples of hardware and memory may include RAM, ROM, EPROM, EEPROM, flash memory, optical disk, registers, hard disk, a removable disk, a CD-ROM or any other types of hardware and memory.

While specific configurations and applications of the present systems and methods have been illustrated and described, it is to be understood that the systems and methods are not limited to the precise configuration and components disclosed herein. Various modifications, changes, and variations which will be apparent to those skilled in the art may be made in the arrangement, operation, and details of the methods and systems disclosed herein without departing from the spirit and scope of the claimed systems and methods.

What is claimed is:

1. A method for dimming a first packet associated with a first bit rate to a second packet associated with a second bit rate, the method comprising:

receiving a first packet;

analyzing the first packet to determine a first bit rate associated with the first packet;

discarding bits associated with at least one parameter from the first packet, wherein the at least one parameter from which bits are discarded is selected based on an encoding mode used for the first packet;

packing, in a base station, remaining bits associated with one or more parameters and a special identifier into a second packet associated with a second bit rate, wherein the special identifier is an illegal parameter value outside of a valid range of values for one of the parameters; and transmitting the second packet.

2. The method of claim 1, wherein the first packet is a full-rate prototype pitch period (PPP) packet.

3. The method of claim 1, further comprising converting a full-rate prototype pitch period (PPP) packet to a special half-rate PPP packet.

4. The method of claim 1, wherein the bits are discarded and the remaining bits are packed into the second packet in response to determining that additional network capacity is desired.

5. The method of claim 1, wherein the first packet is a full-rate code excited linear prediction (CELP) packet.

6. The method of claim 1, further comprising converting a full-rate code excited linear prediction (CELP) packet to a special half-rate CELP packet.

7. The method of claim 1, further comprising transmitting the second packet from the base station to a second base station.

8. The method of claim 1, further comprising transmitting the second packet from the base station to a mobile station.

9. An apparatus for dimming a first packet associated with a first bit rate to a second packet associated with a second bit rate comprising:

a processor;

memory in electronic communication with the processor;

instructions stored in the memory, the instructions being executable to:

receive a first packet;

analyze the first packet to determine a first bit rate associated with the first packet;

discard bits associated with at least one parameter from the first packet, wherein the at least one parameter from which bits are discarded is selected based on an encoding mode used for the first packet;

pack, in a base station, remaining bits associated with one or more parameters and a special identifier into a second packet associated with a second bit rate, wherein the special identifier is an illegal parameter value outside of a valid range of values for one of the parameters; and transmit the second packet.

10. The apparatus of claim 9, wherein the first packet is a full-rate prototype pitch period (PPP) packet.

11. The apparatus of claim 9, wherein the instructions are further executable to convert a full-rate prototype pitch period (PPP) packet to a special half-rate PPP packet.

12. The apparatus of claim 9, wherein the bits are discarded and the remaining bits are packed into the second packet in response to determining that additional network capacity is desired.

13. The apparatus of claim 9, wherein the first packet is a full-rate code excited linear predication (CELP) packet.

14. The apparatus of claim 9, wherein the instructions are further executable to convert a full-rate code excited linear predication (CELP) packet to a special half-rate CELP packet.

15. A system that is configured to dim a first packet associated with a first bit rate to a second packet associated with a second bit rate comprising:

means for processing;

means for receiving a first packet;

means for analyzing the first packet to determine a first bit rate associated with the first packet;

means for discarding bits associated with at least one parameter from the first packet, wherein the at least one parameter from which bits are discarded is selected based on an encoding mode used for the first packet;

means for packing, in a base station, remaining bits associated with one or more parameters and a special identifier into a second packet associated with a second bit rate, wherein the special identifier is an illegal parameter value outside of a valid range of values for one of the parameters; and means for transmitting the second packet.

16. A non-transitory computer-readable medium configured to store a set of instructions executable to:

receive a first packet;

analyze the first packet to determine a first bit rate associated with the first packet;

discard bits associated with at least one parameter from the first packet, wherein the at least one parameter from which bits are discarded is selected based on an encoding mode used for the first packet;

pack, in a base station, remaining bits associated with one or more parameters and a special identifier into a second packet associated with a second bit rate, wherein the special identifier is an illegal parameter value outside of a valid range of values for one of the parameters; and transmit the second packet.

17. A method for decoding a packet, the method comprising:

receiving a packet;

reading a special identifier included in the packet, wherein the special identifier is an illegal parameter value outside of a valid range of values for a parameter in the packet;

discovering that the packet was dimmed from a first packet associated with a first bit rate to a second packet associated with a second bit rate, wherein the dimming is performed in a base station by discarding bits associated with a parameter that is selected based on an encoding mode used for the first packet; and selecting a decoding mode for the packet.

18. A method for dimming a packet from a full-rate to a half-rate, the method comprising:

receiving a full-rate packet;

dimming the full-rate packet to a half-rate packet by discarding bits associated with a parameter from the full-rate packet, wherein the dimming is performed in a base station, wherein the parameter from which bits are discarded is selected based on an encoding mode used for the full-rate packet;

packing the half-rate packet with bits associated with signaling information and with a special identifier, wherein the special identifier is an illegal parameter value outside of a valid range of values for a parameter in the packet; and transmitting the half-rate packet to a decoder.

19. A method for dimming a first packet associated with a first bit rate to a second packet associated with a second bit rate, the method comprising:

receiving a first packet;

analyzing the first packet to determine a first bit rate associated with the first packet;

discarding bits associated with at least one parameter from the first packet, wherein the at least one parameter comprises one of a fixed codebook index, a fixed codebook gain, a delta lag, a band alignment, a line spectral pair, an adaptive codebook gain, a pitch lag, mode-bit information, an amplitude, and a global alignment, wherein the at least one parameter from which bits are discarded is selected based on an encoding mode used for the first packet;

packing remaining bits associated with one or more parameters and a special identifier into a second packet associated with a second bit rate, wherein the special identifier is an illegal parameter value outside of a valid range of values for one of the parameters; and transmitting the second packet.

20. The method of claim 19, wherein the bits are discarded and the remaining bits are packed into the second packet in response to determining that additional network capacity is desired.

21. An apparatus for dimming a first packet associated with a first bit rate to a second packet associated with a second bit rate comprising:

a processor;

memory in electronic communication with the processor;

instructions stored in the memory, the instructions being executable to:

receive a first packet;

analyze the first packet to determine a first bit rate associated with the first packet;

discard bits associated with at least one parameter from the first packet, wherein the at least one parameter from which bits are discarded is selected based on an encoding mode used for the first packet;

pack remaining bits associated with one or more parameters and a special identifier into a second packet associated with a second bit rate, wherein the special identifier is an illegal parameter value outside of a valid range of values for one of the parameters, wherein the at least one parameter comprises one of a fixed codebook index, a fixed codebook gain, a delta lag, a band alignment, a line spectral pair, an adaptive codebook gain, a pitch lag, mode-bit information, an amplitude, and a global alignment; and transmit the second packet.

22. The apparatus of claim 21, wherein the bits are discarded and the remaining bits are packed into the second packet in response to determining that additional network capacity is desired.

23. The method of claim 1, wherein the special identifier is an illegal parameter value outside of a valid range of values for one of the parameters associated with the second bit rate.

* * * * *